United States Patent [19]

Bosch et al.

[11] Patent Number: 4,509,145

[45] Date of Patent: Apr. 2, 1985

[54] ELECTRICALLY BIASED OPTICAL STORAGE MEDIUM

[75] Inventors: Martin A. Bosch, Lincroft; Ross A. Lemons, Tinton Falls, both of N.J.

[73] Assignee: AT&T Bell Laboratories, Murray Hill, N.J.

[21] Appl. No.: 389,877

[22] Filed: Jun. 18, 1982

[51] Int. Cl.³ .................. G11C 11/42; G11C 13/04
[52] U.S. Cl. .................. 365/112; 365/120; 365/126
[58] Field of Search .......... 365/106, 112, 120, 126, 365/127; 369/275

[56] References Cited

U.S. PATENT DOCUMENTS 2,896,507  7/1959  Mast et al. ................. 365/126
3,485,621  12/1969  Kazan ...................... 365/126
4,404,656  9/1983  Cornet ..................... 365/126

Primary Examiner—Terrell W. Fears
Attorney, Agent, or Firm—Bruce S. Schneider

[57] ABSTRACT

The use of a photoconducting material having specific characteristics in conjunction with a heat sensitive optical recording medium also having specific characteristics yields desirable properties. Specifically, through the use of this combination an optical recording medium that has a relatively low applied power threshold for writing and yet a relatively long-term stability is obtained. The photoconductor material should have an unilluminated resistivity of at least $10^6$ Ohm-cm and should undergo a resistivity descrease of at least $10^5$ upon illumination to yield this desired attribute.

17 Claims, 3 Drawing Figures

ELECTRICALLY BIASED OPTICAL STORAGE MEDIUM

BACKGROUND OF THE INVENTION

1. Field of the Invention

This invention relates to information storage media and, in particular, optical information storage media.

2. Art Background

A variety of media have been devised to store information such as digitally encoded information. Two primary requirements for such storage media are that the information is easily written and that it is essentially permanently recorded, i.e., it is possible to accurately read the stored information even substantially after it has been written. Exemplary of a medium which satisfies these requisites is magnetic tape. It is relatively easy to permanently write information on a magnetic tape. However, despite the widespread use of magnetic tapes, other media such as optical storage media have been proposed because they offer the potential for relatively higher storage densities, relatively higher data transfer rates and random access to stored information. In such media, an optical change is induced in the media to record the data. The data is read typically by using a laser beam and a light detector to observe this optical change. A variety of phenomena has been used to effect a readable optical change. For example, a change in absorption, reflection, or Faraday rotation has been employed.

Despite the potential advantages offered by optical media, some compromises are generally made in their use. It is desirable to have a medium which undergoes an optical change when subjected to a relatively low-power level of writing energy. However, generally if a material undergoes writing with low-power levels, it also has somewhat poorer storage stability. Thus, a compromise is usually made between the power required for writing and the storage stability achieved.

Attempts have been made to avoid this compromise while maintaining the desirable properties associated with optical media. For example, garnet magnetic recording materials which undergo an optical change through a change in Faraday rotation are described by J. P. Krumme et al, *Journal of Applied Physics*, 48(1) 366–368 (1977), by J. P. Krumme et al, *Journal of Applied Physics*, 46(6) 2733–2736 (1975), and in U.S. Pat. No. Re. 29,530 reissued Jan. 31, 1978. In the Krumme medium, CdS is placed in thermal contact with a garnet recording material such as $Gd_{2.85}Bi_{0.15}Fe_{4.83}Ga_{0.17}O_{12}$ which is grown epitaxially on a single crystal substrate. Electrodes are positioned on either side of the CdS material. A voltage is applied across the electrodes and light is applied to the CdS material at points corresponding to the desired positions for recording information in the garnet material. The points in the CdS where the light is incident become relatively more conducting, pass a relatively high current induced by the voltage being applied to the electrodes, and thus is rapidly heated. The heat generated in the CdS also heats the thermally adjoining points in the garnet material reducing its anisotropy field. This reduction allows an applied magnetic field to reverse the magnetization in the area adjoining the illuminated region of the photoconductor. The reverse magnetization induces a corresponding change in Faraday rotation. A relatively large quantity of heat is produced in the photoconducting material through the use of a normal light power and through the applied voltage. As a result, writing with nominal power is possible, and in the absence of an applied voltage, the garnet material is stable. Thus, two of the properties desirable in a recording medium are available.

Nevertheless, the reported information storage density, i.e., $2.5 \times 10^5$ bits/cm$^2$, in the magnetic garnet writing medium is relatively poor when compared to other optical recording media which have high-storage densities, i.e., greater than $10^7$ bits/cm$^2$ but which are designed to strike a compromise between stability and required writing power. See, for example, R. A. Bartolini, *Journal of Vacuum Science and Technology*, 18, 70 (1981).

Additionally, epitaxial garnet materials covering large areas have not been grown. Thus, although it is possible to avoid the compromise between nominal power writing and storage stability, it has not been possible to avoid this compromise and maintain relatively high-storage densities over a large area medium—an area greater than 100 cm$^2$.

SUMMARY OF THE INVENTION

A stable, large area storage medium that has a high-storage density (greater than $10^7$ bits/cm$^2$) and that is written with a relatively low applied power is achievable through the use of a specifically chosen photoconducting material in conjunction with a specifically chosen optical storage material. To attain all the desired properties, the photoconducting material should have an unilluminated resistivity of no less than $10^6$ Ohm-cm and should undergo a resistivity decrease of at least $10^5$ upon illumination with the light power employed to write information in the storage medium. Further, to attain the desired properties, the optical storage material should be a material that is formed by a procedure other than epitaxial growth that undergoes an optical change greater than 10 percent upon the application of heat. (This should be compared with optical changes depending on changes in Faraday rotation which are significantly less than 10 percent.) When voltage is applied across the photoconducting material, writing in the optical storage medium at high-storage densities, i.e., greater than $10^7$ bits/cm$^2$, is possible through the application of relatively low-incident light power to the photoconducting material. The resulting medium with its stored information is quite stable and is capable of being produced in areas in excess of 100 cm$^2$.

DETAILED DESCRIPTION

Figure 1:
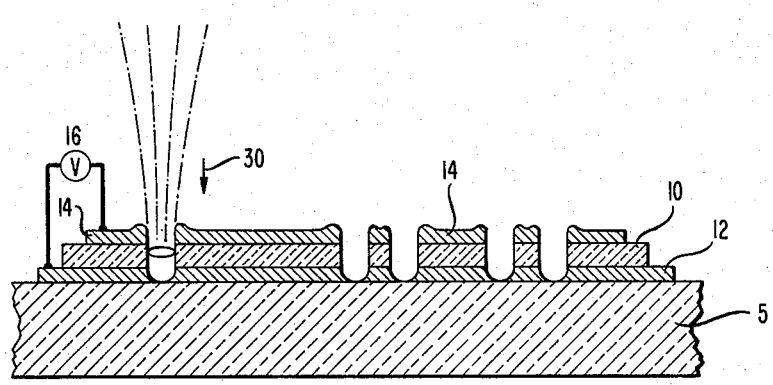
FIGS. 1 through 3 are illustrative of embodiments involving the inventive optical recording media.

The Figures show specific embodiments of storage media configurations suitable for achieving high-storage density at a relatively low applied light power threshold while maintaining long-term storage capabilities. In each configuration, a photoconducting material, 10, is employed. The purpose of the photoconducting material in each configuration is to generate heat in a localized area through the concurrent application of a voltage across the area and incident light upon the area. The voltage is conveniently applied through electrodes such as 12 and 14 in FIG. 1. The heat generated by the concurrent application of a voltage from voltage source, 16, and light produces an optical change in the optical storage medium. For example, the heat induces a change in (1) the topography, by producing a contour such as a pit or bump in the medium, (2) a change in reflectivity, or (3) a change in refractive index.

A voltage is applied across the voltage application means, e.g., electrodes 12 and 14. Light is then made incident on the area of the photoconducting material which is in thermal contact with an area of the storage material where it is desired to produce an optical change. (Thermal contact between an area of the photoconducting material and storage material is established when at least 25 percent of the heat produced in the photoconductor in a localized region reaches a localized region of equivalent area in the storage medium). In the illuminated region of the photoconducting material, the electrical resistivity of the material drops significantly. Because of the applied voltage between the electrodes, the current across the photoconductive medium in the illuminated region increases to a correspondingly high level. Since there is a relatively high current flow, a corresponding level of heat is generated. This localized heat induces an appropriate optical change in the adjacent area of the optical medium.

Typically, the thickness of the photoconductive material and storage medium employed is respectively in the range 0.1 $\mu$m to 2.5 $\mu$m and 0.01 $\mu$m to 2.5 $\mu$m. If thicker layers are employed, it is generally difficult to confine the generated heat so as to produce an optical change in an area sufficiently small to yield a desirable information density. Additionally, photoconductive layers thinner than 0.1 $\mu$m are generally not continuous, while storage medium layers thinner than 0.01 $\mu$m do not usually lead to an adequate optical change. The voltage employed obviously should be sufficient to generate a level of heat adequate to produce the desired optical change. Thus, the voltage employed depends on the heat required to produce the optical change and the illuminated resistivity of the photoconductor material. A control sample is utilized to determine an appropriate voltage for a given resistivity and a given heat requirement. However, for typical resistivities and heat requirements, the voltage need not be above 50 V.

It should be noted that an appropriate result is achieved only when a suitable drop in resistivity is induced by the illuminating light. Thus, the photoconducting material should be chosen to have an unilluminated resistivity of at least $10^6$ Ohm-cm and to undergo a suitable resistivity decrease upon application of light at practical intensity levels, e.g., levels in the range $10^3$ to $10^6$ Watts/cm$^2$. As discussed, suitable resistivity reduction upon illumination should be at least $10^5$, preferably at least $10^6$, most preferably $10^8$ times. Typically such drops in resistivity in advantageous photoconducting materials, such as amorphous hydrogenated silicon, are achievable with light intensities in the range $10^3$ to $10^6$ Watts/cm$^2$. (Quite nominal power requirements are placed on the light employed to write information in the inventive storage system. Most of the power is provided by the applied voltage). After the material is written since voltage is no longer applied, the writing light power needed to alter the optical characteristic of the material increases dramatically. Thus, there is significantly less chance of ambient light or light used in reading the stored information actually causing degradation of the medium or producing unintended writing in the medium.

Figure 2:
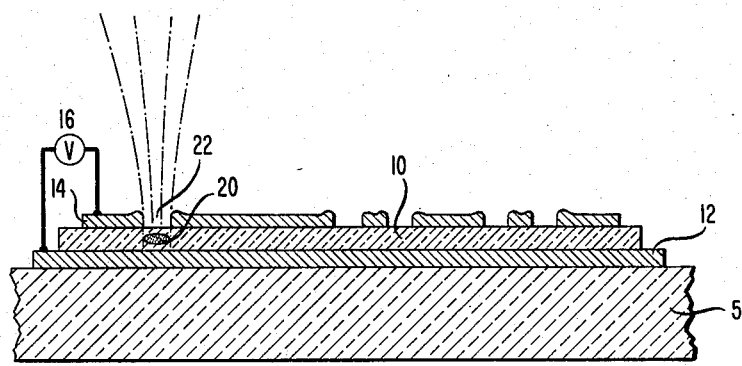

In some suitable configurations for the inventive storage media the photoconducting material serves not only the photoconducting function, but additional functions as well. In the configuration of FIG. 1, the photoconducting material, 10, also serves as the optical storage material. In this configuration, 5, is the substrate, 12, and 14 means for applying a voltage, e.g., electrodes, and 10 the photoconducting and optical storage material. For example, materials such as hydrogenated amorphous silicon with at least 10 atomic percent hydrogen, as described in copending application Ser. No. 336,339 filed Dec. 31, 1981, which is hereby incorporated by reference are suitable for serving this combined function. The configurations of FIGS. 2 and 3, just as that of FIG. 1, have attributes which are derived from the use of a specifically chosen photoconductive material in conjunction with an appropriate optical storage material. In the configuration of FIG. 2, a substrate 5, a photoconductive material, 10, a means to apply a voltage to the photoconductive material such as an electrode 12, and a second electrode, 14, which also serves as the optical recording medium are employed. To write in this material, an electrical potential is established across the photoconductive material 10, between the electrode, 12 and 14. As discussed, illumination of a portion of the photoconductive material produces heating in this illuminated localized area, 20, which in turn causes a perceivable optical change in the corresponding region, 22, of the electrode storage media, 14.

Figure 3:
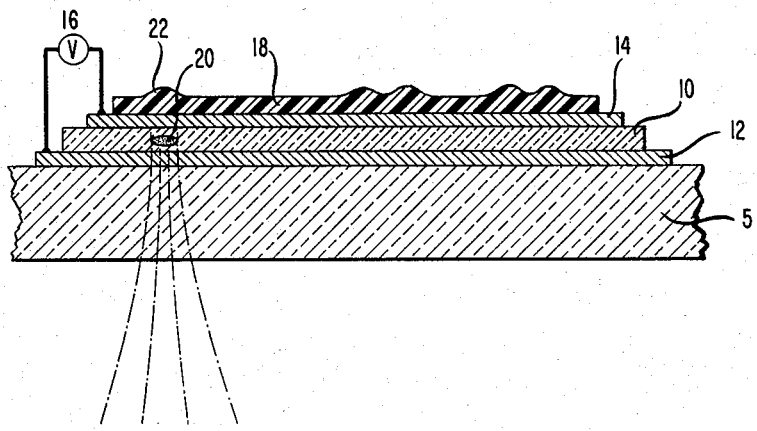

In FIG. 3, two electrodes, 12 and 14, a photoconductive material 10, a substrate, 5, and an optical storage material, 18, are utilized. A voltage is applied across the electrodes which induces heating in an illuminated region, 20, of the photoconductor, 10. This generated heat induces a perceivable optical change in the thermally connected region, 22, of the storage material, 18. In this configuration, the photoconductor functions only as the region where heat is generated. In each configuration, the choice of the properties for the photoconducting material is critical to achieve desirable storage densities. As discussed, the unilluminated photoconducting material should have a resistivity change greater than $10^5$, preferably greater than $10^6$, most preferably greater than $10^8$. If the change in resistivity is less, there is a prohibitive power dissipation in the unilluminated regions with associated degradative effects. Thus, through the use of photoconductors with suitable unilluminated resistivity and illuminated resistivity change in configurations such as shown in FIG. 1 through 3, stable optical storage at relatively high information densities is achieved. (Many other configurations are obviously possible. For example, through the use of a transparent substrate 5, in FIG. 1 or 2 and a transparent electrode, 12, it is possible to write by illumination through the substrate and electrode. Similarly by utilizing a semitransparent optical medium, 18, in FIG. 3, and transparent electrode, 14, it is possible to write with light incident from the optical medium side of the recording body. Alternatively, it is possible for substrate, 5, in FIG. 2 to contact electrode, 14, instead of electrode, 12).

The means for applying a voltage, e.g., the electrodes employed in the various embodiments, are not critical. However, if, for example, an electrode in a particular configuration is between the light source employed for writing and the photoconductive material, it should be transparent to the light used for this writing. For example, in the configuration of FIG. 1, the electrode, 14, should be transparent to the writing light shown coming from direction 30. Such an electrode should have a transmission between 0.1 and 1.0, preferably between 0.7 and 1.0, at the wavelength of the writing light. Generally, it is advantageous to use energy from a laser as the writing energy because the collimated light yields a high-power density for writing. Lasers generally provide light in a narrow wavelength band. (Nevertheless, the use of broadband light is not precluded.) Generally, light in the wavelength range 0.85 $\mu$m to 0.4 $\mu$m is strongly absorbed by most photoconductive materials and is useful.

Various expedients are available for producing a transmissive electrode. For example, relatively thick (up to 1 $\mu$m) layers of transparent conductors such as indium tin oxide or indium oxide are employable for writing wavelengths in the range 0.85 to 0.4 $\mu$m. (See D. B. Fraser and H. D. Cook, *Journal of the Electrochemical Society*, 119, 1368 (1972) for a description of various methods of depositing indium tin oxide.) Alternatively, thin layers, i.e., layers in the range 20 to 200 Å of metals such as Cr, Nb or Au deposited by conventional techniques such as evaporation or sputtering are also employable to produce the desired transmissive electrode.

As previously discussed to achieve high-information storage density over a wide area, the storage material should be one which is not epitaxially grown and should be one which undergoes an optical change of more than 10 percent, upon the application of heat to a localized area. Within the context of this disclosure the requirement that the storage material undergo an appropriate optical change is that either through direct observation or through means for revealing this optical change, the optical gradients in the storage material are observable and vary at least 10 percent. For example, through the use of amorphous hydrogenated silicon (hydrogen content in the range 10 to 50 atomic percent) the application of heat to a localized area produces surface irregularities. These irregularities cause incident light to reflect differently from light incident on the areas of the medium that have not been written. Alternatively, heat applied to media such as a Te-alloy causes localized remelting which in turn causes reflectivity, changes through ablation, surface tension deformation, phase transition, or compositional change. (Different means of optical change are shown in the Figures for illustrative purposes. However, no particular change is necessarily associated with any particular configuration of electrodes, optical medium and photoconducting material). These differences in reflection are detectable through the use of conventional means such as through the use of a photodetector, .e.g., an appropriately positioned photodiode. (See A. E. Bell et al, *RCA Review*, 40, 345 (1979) for a variety of configurations suitable for detecting optical changes that are observable upon the illumination of a written storage medium.)

The inventive media, such as the configurations shown in FIGS. 1 through 3, are produced by conventional techniques. For example, the configuration of FIG. 1 is produced by depositing successively on a substrate a means for applying voltage such as an indium oxide electrode by conventional techniques, e.g., sputtering. An optical medium such as photoconductive hydrogenated amorphous silicon is then in turn deposited on the electrode through conventional techniques such as reactive sputtering. (See T. D. Moustakas, *Journal of Electronic Materials*, 8, 391 (1979) for a description of the deposition of hydrogenated amorphous silicon films.) A second means for applying voltage is then in turn deposited. The configurations of FIGS. 2 and 3 are similarly constructed except that optical storage medium in FIG. 3 is a thermally sensitive material, for example, a polymer such as a photoresist, e.g., AZ-1350J—a proprietary product of Shipley Company which is primarily a novolak based resist. Such photoresists are deposited by conventional techniques such as spinning. (See W. S. Deforrest, *Photoresist Materials and Processes*, 223 (1975) for a description of the spinning procedure.) If a photoresist is employed, optical changes are produced by heat through the process of surface deformation.

The following examples are illustrative of embodiments of the invention and the processes of writing and reading information in such embodiments.

EXAMPLE 1

A low $Na_2O$ glass substrate measuring 25 mm×25 mm×1 mm thick was cleaned by sequentially immersing the substrate in trichloroethane, acetone, and methanol. (The trichloroethane cleaning was done in an ultrasonic bath.) The clean substrate was rinsed in deionized water and dried in dry nitrogen. The substrate was then mounted on a sample holder of an evaporation apparatus. A resistivity heated tungsten boat of an evaporation apparatus was charged with chromium. The apparatus was evacuated to a pressure of approximately $5 \times 10^{-6}$ Torr. The source which was positioned approximately 50 cm from the substrate was heated to a temperature sufficient to yield a one-half Angstrom per second deposition rate on the substrate. After 50 seconds of heating at this temperature, a shutter that was positioned between the source and the substrate was removed and deposition was continued until a layer thickness of 100 Å was deposited. The shutter was then replaced and the deposition source was cooled. The apparatus was vented, the substrate was removed from the evaporation apparatus sample holder, and the substrate was placed on the sample holder of a sputtering apparatus.

A 6 mm wide strip along one edge of the chromium layer was masked by laying a glass slide over this region. A 13 cm in diameter sputtering target of 99.99 percent pure, hot-pressed silicon was also inserted into the apparatus. The apparatus was then evacuated to a pressure of approximately $8 \times 10^{-6}$ Torr. The sputtering chamber was partially isolated from the vacuum pumps and backfilled with a 35 percent hydrogen, 65 percent argon mixture to a total pressure of approximatly $10^{-2}$ Torr. Vacuum pumping at a diminished rate was then continued and the hydrogen/argon gas flow was adjusted to maintain the total gas pressure at a level of $10^{-2}$ Torr. With the substrate removed from the deposition area, an RF plasma was struck in the gas utilizing a power density of approximately 0.42 Watts/cm$^2$. After approximately 5 minutes, the substrate was rotated into the deposition position and deposition was continued until a hydrogenated silicon layer having a thickness of approximately 1.8 $\mu$m was obtained. (During the deposition, the substrate was maintained at a temperature of 280 degrees C. through resistively heating the substrate holder. The total deposition time was approximately 50 minutes.)

The substrate was removed from the sputtering apparatus and again inserted in the evaporation apparatus. A second chromium layer of approximately 100 Å thickness was deposited in the same manner as was employed for the first chromium layer. Again a glass slide was utilized to mask the 6 mm strip along the edge of the first chromium layer. The substrate was then inserted in a spinning apparatus and a few drops of AZ1350J resist was placed on the second chromium layer. The substrate was then spun at 3000 rpm for approximately 30 seconds to yield a resist layer thickness of approximately 1 μm. The substrate with its layers was baked at a temperature of approximately 80 degrees C. in a dry nitrogen atmosphere for 10 minutes. The photoresist was removed from the edges of the two chromium layers so that electrical contact could be made in these exposed areas.

Aluminum leads were attached to the exposed area of the chromium layer by ultrasonic bonding. Twenty-five volts were applied between the two chromium layers. A helium neon laser with a spot size of approximately 2 μm and a power in this spot size of approximately 0.3 mW was employed to write information in the optical recording medium. The laser was made incident on the amorphous hydrogenated silicon by irradiating the medium through the glass substrate and first chromium layer causing absorption in the amorphous hydrogenated silicon. A matrix of dots with center-to-center spaces of approximately 3 μm and diameters of approximately 2 μm were produced. These dots appeared to be hillock-shape distortions on the surface of the resist material.

EXAMPLE 2

The procedure of Example 1 was followed except the photoresist layer was not employed. A voltage of 35 V was applied between the two chromium layers. A laser as discussed in Example 1 was employed and was made incident on the second chromium layer. The light absorbed in the amorphous hydrogenated silicon resulted in voids from the second chromium layer to the glass substrate having cross-sectional dimensions of approximately 2 μm. Small hillock distortions also occurred on the second chromium layer at the edges of these voids.

EXAMPLE 3

The recording medium of Example 2 was produced except the first chromium layer was replaced by an indium oxide layer. This was done by purchasing the glass with an indium oxide layer of approximately 1 μm already deposited on it. The amorphous silicon and upper chromium layer were then deposited as described in Example 1. Voids were produced in this medium as described in Example 2. Because of the thickness of the indium oxide layer, some debris was observed on the surface of the chromium layer.

EXAMPLE 4

The procedure of Example 3 was followed except the upper metal layer was a niobium layer. This niobium layer was deposited by secondary ion beam deposition. The substrate with its indium oxide and amorphous hydrogenated silicon layer was placed on the sample holder of a secondary ion beam sputtering apparatus. A niobium target having a purity of 99.99 percent and dimensions of 50 mm×50 mm×1.5 mm was placed approximately 75 mm from the substrate. The chamber was evacuated to a pressure of approximately $3\times10^{-6}$ Torr. An argon beam with a current density of approximately 1 mA/cm$^2$ and a beam energy of 1500 V was impacted on the niobium target. The bombarding of the target was continued for approximately 55 seconds to produce a deposited niobium layer with a thickness of approximately 100 Å on the amorphous hydrogented silicon layer. Voids were produced in this recording media by the procedure of Example 3.

What is claimed is:

1. An optical storage medium which undergoes a perceivable optical change in a localized area upon illumination with electromagnetic radiation in a localized illuminated region, comprising a storage material which undergoes an optical change in said localized area upon localized heating characterized in that
    (A) said localized illuminated region includes a portion of a photoconductive material which has an unilluminated resistivity of at least 10$^6$ Ohm-cm and which undergoes a resistivity decrease of at least 10$^5$ upon said illumination,
    (B) said localized illuminated region is in thermal contact with said localized area of said storage material, and
    (C) means are present for applying a voltage to said photoconductive material wherein said voltage application means are situated such that upon said illumination, a substantial current flows across said photoconductive material,
wherein said localized area of said storage medium is capable of undergoing an optical change of greater than 10 percent and wherein an information storage density greater than 10$^7$ bits/cm$^2$ is achievable.

2. The medium of claim 1 wherein said means for applying a voltage comprises an electrode.

3. The medium of claim 2 wherein said electrode comprises indium oxide.

4. The medium of claim 2 wherein said electrode comprises indium tin oxide.

5. The medium of claim 1 wherein said photoconductive material also comprises said storage material.

6. The medium of claim 1 or 5 wherein said photoconductive material comprises amorphous hydrogenated silicon.

7. The medium of claim 6 wherein hydrogen comprises between 10 and 50 atomic percent of said amorphous hydrogenated silicon.

8. The medium of claim 1 wherein said storage material comprises a polymer.

9. A process for recording information in an optical storage medium comprising the step of illuminating a localized region in said optical storage medium with electromagnetic radiation to induce a localized area to undergo a perceivable optical change characterized in that said localized region includes a photoconductive material which has a resistivity of at least 10$^6$ Ohm-cm and which undergoes a resistivity decrease of at least 10$^5$ upon said illumination wherein said optical change of at least 10 percent is achieved by applying a voltage to said photoconductive material thereby producing heat in said localized region which produces said optical change in a thermally connected storage material wherein information storage densities of at least 10$^7$ bits/cm$^2$ are achievable.

10. The process of claim 9 wherein said voltage is applied with an electrode.

11. The process of claim 10 wherein said electrode comprises indium oxide.

12. The process of claim 11 wherein said electrode comprises indium tin oxide.

13. The process of claim 9 wherein said photoconductive material also comprises said storage material.

14. The process of either claim 9 or 13 wherein said photoconductive material comprises amorphous hydrogenated silicon.

15. The process of claim 14 wherein hydrogen comprises between 10 and 50 atomic percent of said amorphous hydrogenated silicon.

16. The process of claim 9 wherein said storage material comprises a photoresist.

17. The process of claim 9 wherein said illumination is provided by a laser.

* * * * *

UNITED STATES PATENT AND TRADEMARK OFFICE
CERTIFICATE OF CORRECTION

PATENT NO. : 4,509,145

DATED : April 2, 1985

INVENTOR(S) : Martin A. Bosch and Ross A. Lemons

It is certified that error appears in the above-identified patent and that said Letters Patent is hereby corrected as shown below:

Column, 1, line 68, "normal" should read --nominal--.

Signed and Sealed this

Eighteenth Day of February 1986

[SEAL]

Attest:

DONALD J. QUIGG

Attesting Officer

Commissioner of Patents and Trademarks